March 23, 1943.　　　　H. BRANDT　　　　2,314,815
APPLIANCE FOR MOTOR VEHICLES
Filed Nov. 1, 1940　　　4 Sheets-Sheet 1
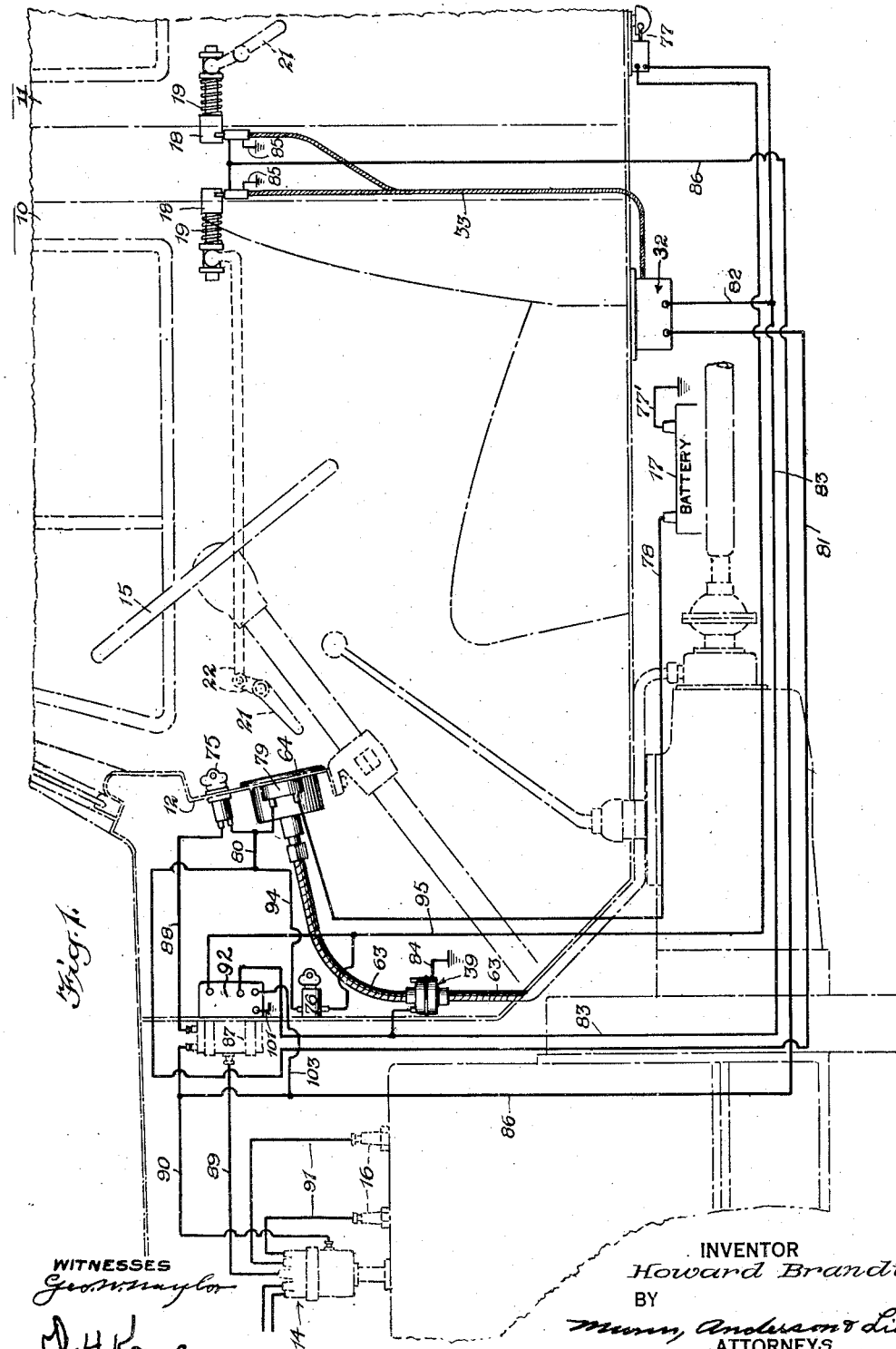
INVENTOR
Howard Brandt
BY
ATTORNEYS March 23, 1943. H. BRANDT 2,314,815
APPLIANCE FOR MOTOR VEHICLES
Filed Nov. 1, 1940 4 Sheets-Sheet 2
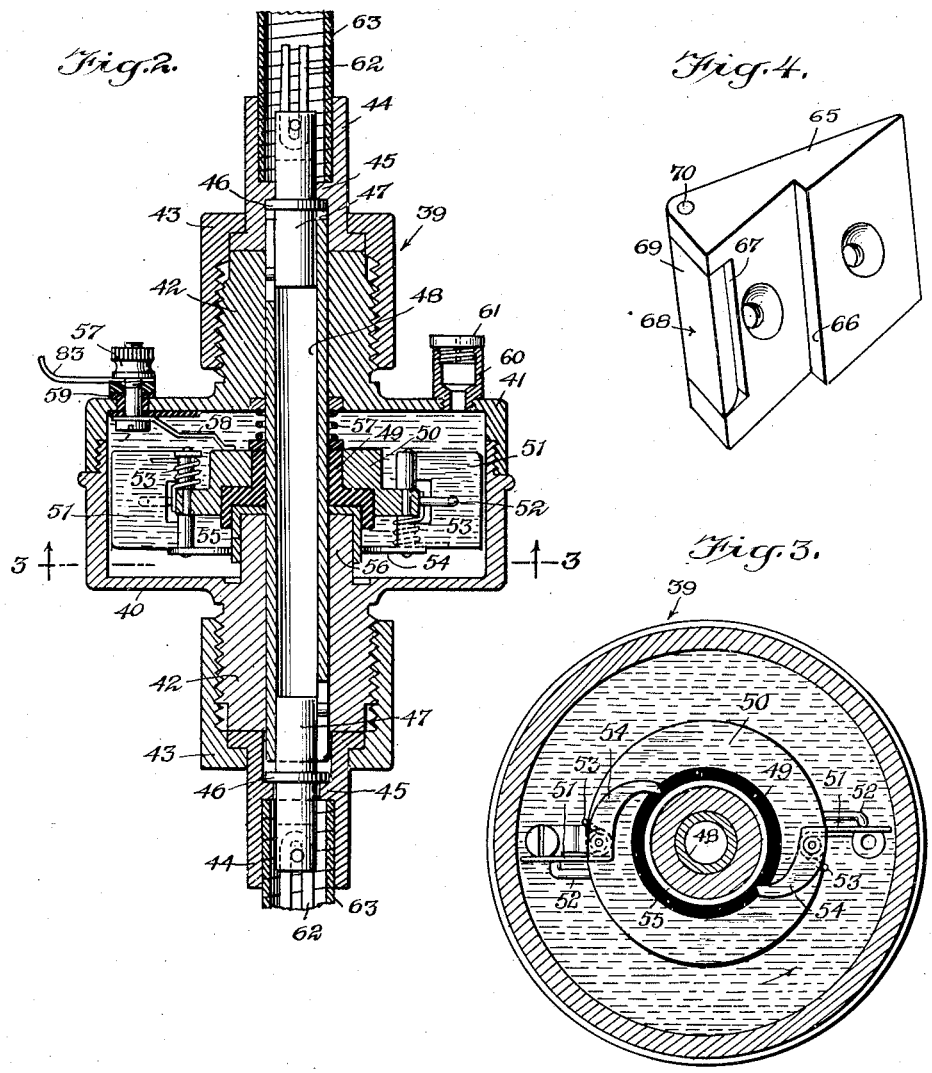
INVENTOR
Howard Brandt
BY
Munn, Anderson & Liddy
ATTORNEYS
WITNESSES March 23, 1943. H. BRANDT 2,314,815
APPLIANCE FOR MOTOR VEHICLES
Filed Nov. 1, 1940 4 Sheets-Sheet 3

WITNESSES

INVENTOR
Howard Brandt
BY
Munn, Anderson & Liddy
ATTORNEYS

March 23, 1943.   H. BRANDT   2,314,815
APPLIANCE FOR MOTOR VEHICLES
Filed Nov. 1, 1940   4 Sheets-Sheet 4

WITNESSES

INVENTOR
Howard Brandt
BY
ATTORNEYS

Patented Mar. 23, 1943

2,314,815

UNITED STATES PATENT OFFICE 2,314,815

APPLIANCE FOR MOTOR VEHICLES

Howard Brandt, New York, N. Y.

Application November 1, 1940, Serial No. 363,899

8 Claims. (Cl. 180—82)

This invention relates to improvements in appliances for motor vehicles particularly appliances for increasing the safety and preventing the theft of motor vehicles.

Heretofore attempts have been made to provide safety devices to prevent motor vehicle doors from accidentally opening. However, these attempts have not been satisfactory.

It is an object of this invention to overcome the difficulties heretofore encountered and to provide an improved safety appliance of the above character to prevent the doors of a motor vehicle from opening while the vehicle is in motion.

A further object is the provision of an improved switch operating in response to the rotation of a shaft and which may be used in controlling the operation of my safety appliance.

It is also an object of my invention to provide a striker cam to be engaged by the bolt of the door lock so as to prevent my improved safety appliance from inadvertently becoming jammed.

A further object is the provision of an improved safety appliance for preventing the operation of a motor vehicle when the door is not fully closed.

Another object of the invention is the provision of an improved device for preventing or minimizing the danger of theft of the automobile.

In the accompanying drawings in which I have shown one illustrative embodiment of my invention.

Fig. 1 is a partially diagrammatic elevational view of the appliance embodying my invention showing the pertient portions of a motor vehicle in dotted lines;

Fig. 2 is an elevational sectional view of the control switch which may be used in connection with my device;

Fig. 3 is a cross sectional view in the direction of the arrows on the line 3—3 of Fig. 2;

Fig. 4 is a perspective view of the striker plate and striker cam used in connection with my invention;

Figure 6:
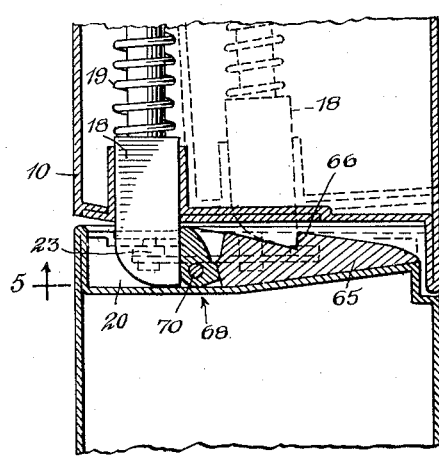
Fig. 6 is a sectional view on the line 6—6 of Fig. 5.
Figure 5:
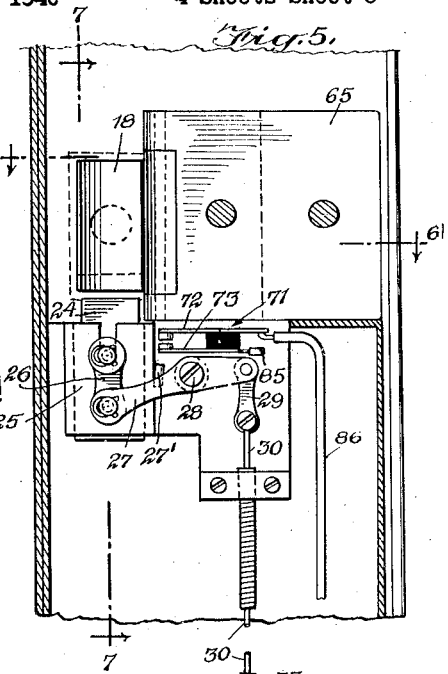
Fig. 5 is a partially fragmentary view of the door control mechanism for preventing the door from opening when the motor vehicle is in motion, and also showing a portion of the mechanism for preventing the motor vehicle from operating when the door is incompletely closed.
Figure 7:
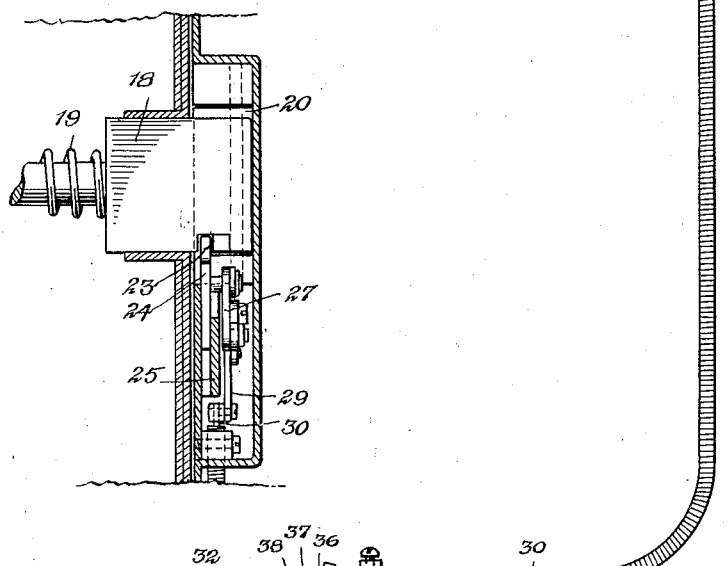
Fig. 7 is a sectional view on the line 7—7 of Fig. 5.

My invention is adapted to be applied to a standard type of motor vehicle. In Fig. 1 the pertinent portions of a motor vehicle of the sedan type are shown in dotted lines. Thus the numerals 10 and 11 show the front and rear doors on one side of the vehicle, the numeral 12 represents the dash-board, 87 indicates ignition coil, 14 shows the distributor, 15 represents the steering-wheel, 16 designates the spark plugs and the battery is shown at 17. While one type of motor vehicle is shown, it should be appreciated that my invention is equally applicable to other types.

My invention embodies several different aspects, namely:

1. A door control device for preventing the doors from opening when the vehicle is in motion and for preventing the vehicle from operating when a door is incompletely closed.

2. An improved control switch for controlling the operation of the device.

3. An improved striker cam to be engaged by the door bolts to prevent inadvertent jamming between portions of the door control device and the bolt.

4. My improved anti-theft device for preventing or minimizing the danger of theft of the car.

Each of these portions will be separately described.

The door control device

Referring more specifically to Figs. 1 and 5–7, it will be seen that my improved door control device can be used with a standard type of door latch. The door latch shown consists of a bolt 18 normally pressed by a spring 19 into engagement with a keeper 20 formed in the door jamb. The bolt may be retracted to permit the door to be opened in the usual manner by means of a handle 21 which is suitably connected to the bolt as by means of links 22. The side of the bolt which is disposed towards the inside of the car is preferably rounded while the opposite side is straight. The rounded face facilitates the closing of the door while the straight face resists accidental opening thereof. The door latch illustrated and described is one conventional type of door latch and it should be appreciated that my invention may be used in connection with other types of door latches.

So that the bolt may be held in locked position in engagement with the keeper to prevent opening of the door while the automobile is in motion, I provide one side, preferably the under-side thereof, with a socket 23 which is adapted to be engaged by a slide 24 mounted in a guide 25 in the door jamb immediately beneath the keeper. The slide 24 may be shifted between an elevated position in engagement with socket 23 and a retracted position out of engagement with the socket and positioned entirely beneath the plane of the lower surface of the bolt. When the slide is in engagement with the socket, it will be seen that it retains the bolt in the keeper so that it cannot be retracted by means of handle 21.

In carrying out my invention, I connect the slide 24 to suitable operating and control mechanism which causes it to shift upwardly into engagement with the socket when the car is in motion. For this purpose the slide is connected by means of a link 26 to a crank 27 which is fulcrumed at 28 to a rigid portion of the door jamb and the opposite end of the crank is pivotally connected to link 29 which in turn is connected by means of flexible cable 30 to armature 31 of magnet 32. Flexible cable 30 is protected by means of a tubular sheath 33 which is stationary and does not move when the magnet is actuated. The armature 31 is pivotally connected at one end indicated at 34 to a stationary frame 35 which also serves to support the magnet and is normally held in spaced relationship with respect to the magnet by means of spring 36 extending between the frame and the armature. When the winding of the magnet is energized, the armature is pulled towards the magnet which results, through the medium of cable 30, link 29, crank 27 and link 26, in the elevation of slide 24 into engagement with the socket formed in the bolt.

So as to insure positive engagement between the slide and the socket and for a further purpose hereinafter described, I have found it desirable to so form the armature 31 that its path of motion is more than sufficient to shift the slide into engagement with the socket and to take up the excess motion of the armature I connect the armature to a collar 36 disposed around flexible cable 30 and I provide a spring 37 between the collar 36 and another collar 38 which is rigidly secured adjacent the end of cable 30. The winding of magnet 32 is connected in series with a suitable switch 39 which closes the circuit and energizes the winding as soon as the motor vehicle begins to move thereby causing the slide to shift into engagement with the socket of bolt 18 and preventing the door from opening. The switch is so constructed and the circuits are so arranged that the winding of magnet 32 continues to be energized as long as the car is in motion.

The description of the switch 39 and of the circuit diagram is hereinafter set forth under appropriate headings.

The door control device also includes a switch which is operated when the door is incompletely closed and serves to short circuit or ground out the distributor. The switch is shown more clearly in Figs. 5 and 8 and is indicated by the numeral 71. It consists of a pair of spring contacts 72 and 73 normally arranged in spaced relationship in the manner shown. However the contact strip 73 is positioned in the path of movement of the lever 27 and when the lever 27 pivots upwardly beyond a predetermined point, lug 27' on lever 27 engages contact arm 73 causing it in turn to engage contact arm 72 with the result that the circuit is closed.

As will be more fully explained in connection with the circuit diagram, the switch 71 is arranged in a circuit which grounds out or short circuits the distributor and prevents further operation of the motor vehicle when the door is incompletely closed. When the door is completely closed, slide 24 fits into socket 23 of bolt 18 and the top of the socket is so positioned that lug 27' on lever 27 does not engage contact arm 73. When however the door is not completely closed and the bolt occupies the position indicated in dotted lines in Fig. 6, there is nothing to obstruct the movement of slide 24. Accordingly lever 27 shifts upwardly a sufficient distance to force contact 73 into engagement with contact 72.

*The control switch*

My improved switch 39 which controls the operation of the door control device is so constructed as to be operated by the movement of a body such as the rotation of a shaft or cable and requires substantially no energy for its operation. For this purpose I provide a suitable casing consisting of two complementary cup-like members 40 and 41 which are threaded together in the manner shown. The central portion of the cup shaped members 40 and 41 are formed with externally threaded tubular studs 42 in registry with each other and threaded to the studs 42 are the couplings 43 which serve to hold the collars 44 in position. The collars are provided with internal flanges 45 which engage with ribs 46 formed on the tubular rotatable stub shafts 47 thereby serving to hold the shafts in position. The stub shafts 47 are provided with splined connections with the two ends of shaft 48 which extends longitudinally of the switch through the central portion thereof and may rotate with respect thereto.

Mounted on the central portion of shaft 48 is a collar of insulating material 49 which supports a ring of conducting material 50. Pivotally mounted on the ring 50 of conducting material are a pair of vanes 51 which project outwardly from the ring and are normally held in radial position and in engagement with stops 52 by means of springs 53. The vanes may pivot against the tension of the springs in a clockwise direction as viewed in Fig. 3. Projecting inwardly from each of the vanes is a contact arm 54 which is normally in spaced relationship with respect to a contact strip 55 disposed around and rotatable with respect to the tubular collar 56 formed on the inside of the casing. When the vanes 51 are pivoted against the tension of their respective springs, it will be seen that contact arms 54 engage the contact strip 55. Contact strip 55 is connected to and rotates with shaft 48. The contacts 54 are preferably pointed so as to insure positive contact with strip 55.

The tubular collar 56 serves as a seat and bearing member for the rotating portions of the switch and the insulating collar 49 is formed with a depending apron which overlaps the collar 56 and contact strip 55 in the manner shown so as to completely insulate the ring 50 from the shaft. Suitable washers and packing may be provided in the switch in the manner shown and I also preferably provide a spring 57 which extends between the casing member 41 and the insulation collar 49.

I also provide the casing member 41 with a suitable terminal 57 which is connected by spring contact strip 58 to the ring 50. Terminal 57 and contact strip 58 are suitably insulated from the casing of the switch as indicated at 59. The shaft 48 is grounded due to its connection with the speedometer cable and the terminal 57 is connected to the positive side of the circuit. It will be seen that when the vanes are in the radial position shown in Figs. 2 and 3 the circuit is opened. However when the vanes are pivoted against the tension of their springs so that the contact arms 54 engage the contact strips 55 the circuit is closed, the current traveling through terminal 57, contact strip 58, ring 50, contact arms 54, contact strip 55 and thence to the casing which as previously stated is grounded.

The vanes 51 are caused to pivot upon the rotation of shaft 48 by providing inside of the casing a dielectric fluid medium of substantial density such as for instance a relatively viscous petroleum oil. The petroleum oil may be introduced into the casing through the small opening 60 which is provided with a suitable closure 61. The chamber inside of the casing is preferably filled with oil. When shaft 48 is rotated in a clockwise direction as viewed in Fig. 2 and in a counterclockwise direction as viewed in Fig. 3 the resistance offered by the oil causes the vanes 51 to pivot against the tension of their springs and to close the circuit between contact arms 54 and contact strip 55. The springs 53 should be of sufficient strength to return the vanes to their normal radial position when rotation of shaft 48 ceases. However they should be adjusted so that immediately upon a very slight movement of shaft 48 the vanes are caused to pivot and close the circuit. It will be appreciated that shaft 48 offers very little resistance to rotation and accordingly substantially no energy is required to operate the switch.

In my present invention I connect the switch 39 in a suitable manner to the wheels or driving mechanism of the motor vehicle so as to cause the shaft 48 to rotate when the vehicle moves. I have found that this can be satisfactorily accomplished by connecting the shaft 48 to the speedometer cable. This is clearly shown in Figs. 1 and 2 in which the rotating portions of the cable are indicating at 62 and are attached to the stub shafts 47. The cable is of course provided with the usual housing or sheath 63 and connects to a speedometer 64 in the usual manner. The speedometer cable is connected in the illustrated motor vehicle to the drive shaft but it will be appreciated that it may be connected directly to one of the wheels or if preferred a separate cable may be employed instead of the speedometer cable. A complete description of the circuit diagram of the switch will be given in a later portion of the specification.

The striker cam

My improved striker cam is illustrated more clearly in Figs. 4 and 6 and it serves to prevent jamming between the slide 24 and socket 23 which might prevent the slide from dropping downwardly when the motor vehicle stops moving. The average automobile door and door frame are provided with rubber bumpers which exert outward pressure against the door when it is closed so as to prevent it from rattling. This pressure is frequently sufficient to prevent spring 19 from returning bolt 18 to its completely projected position in keeper 20, in those instances when the bolt has been partly retracted by the occupant of the car. It will be appreciated that while the vehicle is in motion the bolt can be retracted until the slide 24 engages the side of socket 23. If the bolt remains in its partly retracted position with slide 24 in engagement with the side of socket 23, the frictional engagement, which is maintained by the tension exerted by the bumpers, prevents the automatic release of the slide 24 from its socket when the automobile stops moving. I have, accordingly, provided a new type of striker cam adapted to be engaged by the bolt 18 and which will permit the bolt to return part of the way to its fully projected position after it has been partially retracted thereby relieving the friction between the slide 24 and socket 23.

For this purpose I provide a striker plate 65 on the door jamb in front of the keeper and the striker plate is provided with the usual safety step or ledge 66 which may be engaged by the bolt in the manner indicated in dotted lines in Fig. 6 when the door has not been completely closed. The inner edge of the striker plate immediately in front of the keeper is recessed in the manner indicated at 67 in Fig. 4 and pivotedly mounted in the recessed portion is my improved striker cam 68. The striker cam has a flat surface 69 which is adapted to engage the bolt and is eccentrically mounted on pivots 70 positioned near the inner side of the cam and it tapers toward its outer end in the manner indicated. The cam is of sufficient height so as to engage the entire height of the bolt.

It will thus be seen that in practice the cam will operate as follows: When the door is completely closed and the bolt 18 is completely projected it will assume the position shown in full lines in Fig. 6. Since the bolt extends past the pivotal point the flat surface 69 of the cam will rest against the side of the bolt. When the bolt is partially retracted up to or past the pivotal point 70 the cam will pivot which permits the door to shift outwardly to a slight extent. The outward shifting reduces the tension of the door bumpers to such an extent that spring 19 may then return bolt 18 at least a sufficient amount to release the frictional engagement between slide 24 and the side of socket 23. Thus when the automobile stops moving the slide 24 will automatically drop downwardly from the socket permitting the door to be opened. Accordingly it will be seen that my improved striker cam 68 prevents jamming between the door bolt and the door control mechanism.

The anti-theft device

In addition to the usual key operated ignition switch which is indicated at 75 in the drawings, I also provide a key operated switch 76 which is preferably placed in a partially concealed position as for instance, beneath the dash board in the manner indicated in Fig. 1. The key operated switch 76 is connected in electrical circuits so as to cause three simultaneous results which will prevent the theft of the car and will also reveal and trap the thief. When the operator of the car leaves it he turns the key in switch 76 so as to close the circuit at that point and removes the key. If an attempt is thereafter made to operate the car without first opening the switch 76, a suitable alarm device such as the bell 77 will start operating, the doors will be locked in closed position by means of the door control mechanism previously described and the distributor will be short circuited or grounded out so as to prevent further operation of the engine.

The electrical circuit

Figure 8:
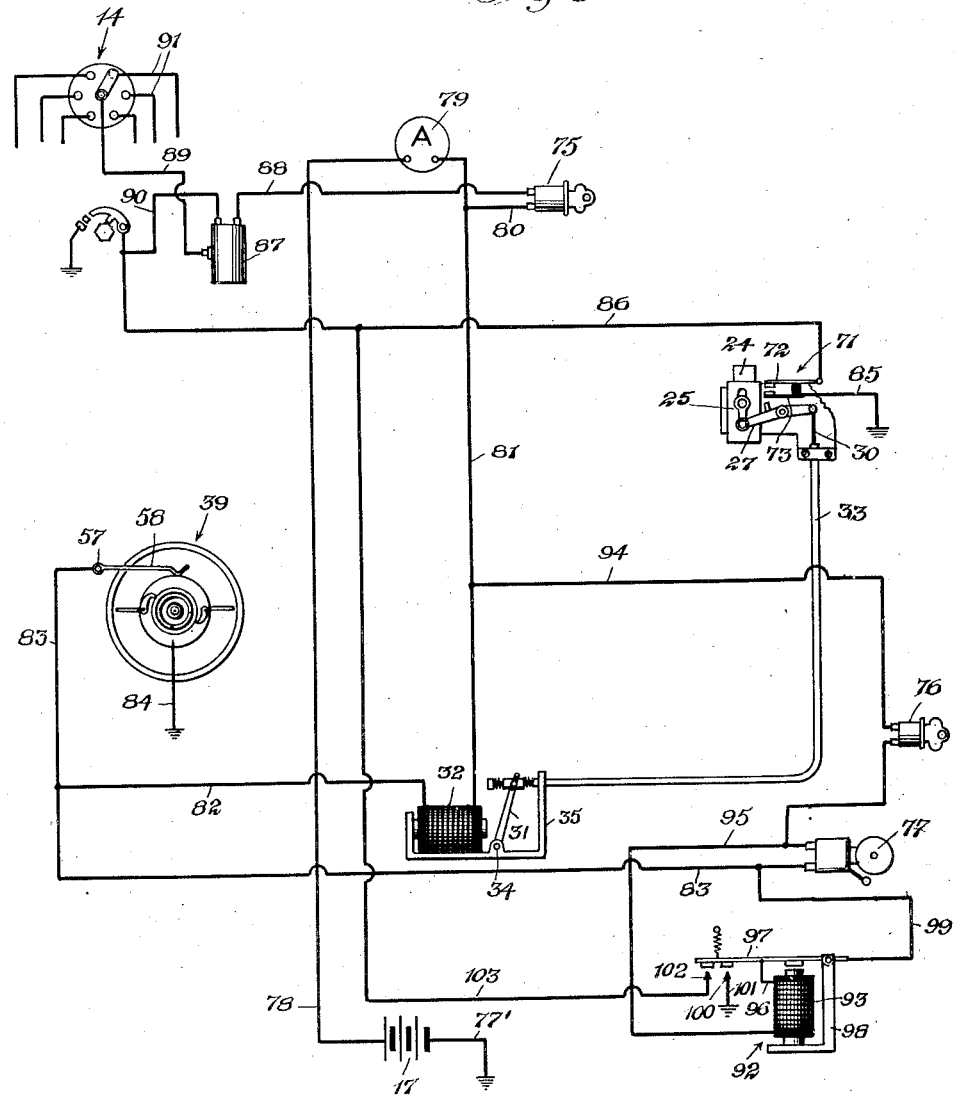
Fig. 8 is a diagram of the electrical circuits which may be employed in my device.

The electrical circuits whereby the several results heretofore described are coordinated and obtained are shown more clearly in Figs. 1 and 8. It will be seen that one terminal of the battery 17 usually the negative side is connected in the usual manner by a lead 77' to the frame of the motor vehicle which serves as a ground. The other terminal is connected by lead 78 to an ammeter 79 which in turn is connected by a lead 80 to the ignition switch and by a lead 81 to one end of the winding of magnet 32. The other end of the winding of magnet 32 is connected by lead 82 to lead 83 which is attached to terminal 57 of switch 39. As previously stated the casing of switch 39 is suitably grounded as by means of a lead 84 connected to the frame of the car.

It will thus be seen that the door control device operates as follows: One end of the winding of magnet 32 is connected to the positive side of the battery by means of lead 81, ammeter 79 and lead 78. When the car is stationary the circuit connecting the opposite end of the winding of magnet 32 to the grounded side of the battery is open due to the fact that arms 54 of switch 39 are normally in spaced relationship with respect to contact strip 55. As soon as the motor vehicle starts moving and the speedometer cable starts rotating, the vanes 51 pivot against the tension of springs 53 causing arms 54 to engage contact strip 55 thereby closing the electrical circuit through leads 82 and 83, switch 39 and lead 84 to the frame of the car. Magnet 32 is accordingly energized causing armature 31 to shift towards the magnet with the result that slide 24 shifts upwardly into engagement with socket 23 in bolt 18 preventing the bolt from being withdrawn and the door from being opened. The circuit remains closed and accordingly the door remains locked as long as the car is in motion. When the car again becomes stationary the vanes 51 again assume their normal radial position with the result that the circuit is broken, the magnet is de-energized and slide 24 drops downwardly from engagement with the socket in bolt 18 permitting the door to be opened.

The circuit for switch 71 which prevents the motor vehicle from operating when the door is incompletely closed is as follows: Contact arm 73 is grounded to the frame of the car through lead 85 and contact 72 is connected by lead 86 to the distributor circuit so as to short circuit or ground out the distributor 14. In this connection it will be seen that coil 87 is connected to ignition switch 75 by lead 88 and is connected to the distributor by means of leads 89 and 90 in the usual manner. Lead 86 from switch 71 is connected to lead 90 and accordingly when the switch 71 is closed the distributor will no longer function. The distributor of course is connected in the usual manner by means of leads 91 to the spark plugs 16.

As previously described switch 71 is closed by lever 27 when the door is improperly closed. When the door is properly closed the switch remains open. Accordingly the device only functions to prevent the motor vehicle from operating when the door is improperly closed.

The operation of the anti-theft device is controlled through a relay 92 and the circuit of the winding of magnet 93 of the relay is as follows: The positive side of the battery is connected by means of lead 78, ammeter 79, lead 81 and lead 94 to switch 76 which in turn is connected by lead 95 to one terminal of alarm bell 77 and to one end of the winding of magnet 93. The opposite end of the winding of magnet 93 is connected by lead 96 to the armature of the magnet indicated at 97 which is pivotally mounted at one end to the frame 98 which supports the magnet. Armature 97 is insulated from the frame 98 and is electrically connected by lead 99 to lead 83 which in turn is connected to terminal 57 of switch 39. Lead 83 is also connected to one of the terminals of alarm bell 77.

It will thus be seen that when switch 76 is closed the electrical circuit of magnet 93 from the positive side of the battery is completed. While the car is stationary however the circuit is open on the grounded side. As soon as the car starts moving switch 39 closes with the result that the circuit of the magnet 93 is closed causing the relay to operate. When the magnet 93 is energized armature 97 is pulled towards the magnet permanently locking it in until the circuit is broken at switch 76 due to the fact that the armature 97 engages a contact 100 which is grounded to the frame of the car as shown at 101 so that the circuit of the magnet is then completed through armature 97 and contact 100 and no longer depends upon switch 39. At the same time armature 97 engages a contact 102 which is connected by a lead 103 to lead 86 with the result that the operation of relay 92 causes the distributor to be short circuited or grounded out preventing further operation of the car.

The circuit for alarm bell 77 is also completed first through switch 39 and lead 83 and then through lead 101, armature 97 and lead 99.

The operation of relay 92 also causes the door to be locked in closed position even though the car stops moving. This is accomplished as follows: It will be appreciated that the positive side of battery 17 is connected to one end of the winding of magnet 32 and that normally the other end of the winding is connected to the grounded side of the battery when the car is in motion through leads 82 and 83, switch 39 and lead 84. When relay 92 is energized the grounded side of the battery is also connected to the winding of magnet 32 through leads 82, 83 and 99, armature 97 and lead 101.

Thus it will be seen that when the operator of the car closes switch 76 and removes the key therefrom unauthorized use of the car is effectively prevented. When an unauthorized person does use the car, it results in the grounding out of the distributor, the operating of alarm 77, and the locking of the doors.

From the foregoing it will be appreciated that I have provided an improved appliance for motor vehicles which prevents the doors from opening when the vehicle is in motion, which prevents the motor vehicle from operating when the doors are improperly closed, and which effectively prevents or minimizes the danger of theft of the car. I have also provided an improved control switch for controlling the operation of the appliance and an improved striker cam to prevent jamming between portions of the door control device and the latch bolt of the door.

It should be understood of course that while I have illustrated and described one embodiment of my invention, many modifications may be made within the scope of the accompanying claims.

I claim:

1. The combination with a vehicle having a door and a door jamb, of a latch bolt having a socket formed therein and disposed in the door and engageable with a keeper formed in the jamb, a slide mounted on the jamb and engageable with the socket so as to lock the door in closed position, means for shifting the slide into and out of engagement with the socket in the latch bolt and a striker cam pivotally mounted adjacent the keeper on the door jamb and engageable with the outer surface of the latch bolt when the door is in closed position, the surface of the cam which engages the latch bolt being substantially flat and the cam being tapered in thickness from the base of the keeper towards the door.

2. The combination as set forth in claim 1 in which the pivotal mounting for the cam is eccentrically disposed towards the broader end thereof.

3. The combination with a motor vehicle having a door jamb and a door shiftable between open and closed positions, of a latch bolt in the door engageable with a keeper formed in the jamb, a member mounted on the door jamb and shiftable into engagement with the latch bolt when the door is in fully closed position and shiftable a predetermined greater distance when the door is not in fully closed position, a normally open switch mounted on the door jamb and means operatively connected to the shiftable member and engageable with the switch so as to close it when the door is not fully closed and the said shiftable member shifts a predetermined greater distance, and an electrical circuit controlled by the switch and operatively connected to the motor vehicle engine to prevent operation thereof when the switch is closed.

4. The combination set forth in claim 3 in which the shiftable member is caused to shift instantly when the motor vehicle begins moving and to remain in shifted position as long as the vehicle remains in motion.

5. The combination with a motor vehicle having a door jamb and a door shiftable between open and closed positions, of a latch bolt in the door engageable with a keeper formed in the jamb, said bolt being formed with a socket therein, a slide mounted on the jamb and engageable with the socket when the door is in fully closed position so as to lock the door in closed position, the latch bolt being outside of the path of movement of the slide when the door is not fully closed and the slide being then shiftable a predetermined greater distance, means for shifting the slide into engagement with the socket when the motor vehicle begins moving, a switch mounted on the door jamb adjacent the slide, means operatively connected to the slide and adapted to engage and operate the switch when the door is incompletely closed and the slide shifts a predetermined greater distance and an electrical circuit controlled by the switch for preventing the operation of the motor vehicle engine when the door is incompletely closed.

6. An appliance for preventing the theft of a motor vehicle comprising a relay, an electrical circuit for the relay, key operated switch in the circuit, a second switch in the circuit which closes upon the movement of the motor vehicle and a second circuit controlled by the relay and adapted to short circuit the distributor of the vehicle engine and prevent further operation of the motor vehicle engine when the key operated switch is closed.

7. An appliance for preventing the theft of a motor vehicle as set forth in claim 6 which is provided with an audible alarm controlled by said relay and with means for locking the doors in closed position, also controlled by said relay.

8. The combination with a vehicle having a door, of apparatus for trapping an unauthorized user of the vehicle therein comprising electrically operated means for locking the door in closed position, a circuit for controlling the electrically operated means, means including a first switch operated by the movement of the vehicle for closing the circuit to lock the door when the vehicle is in motion; means including a second switch connected in parallel with the first switch, a relay for controlling the second switch, and a circuit having a key-operated switch for thereafter retaining the circuit in closed position even after the vehicle stops moving; and means operated by the key operated switch for stopping the operation of the vehicle engine when the vehicle begins to move.

HOWARD BRANDT.